(12) United States Patent
Gluck et al.

(10) Patent No.: US 6,263,670 B1
(45) Date of Patent: Jul. 24, 2001

(54) LOOP FLUSHING CIRCUIT FOR LUBRICATING ROTATING ELEMENTS IN A HYDROSTATIC TRANSMISSION MODULE

(75) Inventors: Steven H. Gluck, Cambridge; Jeffrey A. Baldus, Huxley; Jim D. Ryken, Roland, all of IA (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/409,503

(22) Filed: Sep. 30, 1999

(51) Int. Cl.[7] .................................................... F16D 31/02
(52) U.S. Cl. .................. 60/464; 60/468; 60/493; 60/494
(58) Field of Search ............................ 60/464, 468, 487, 60/493, 494

(56) References Cited

U.S. PATENT DOCUMENTS

| | | | |
|---|---|---|---|
| 3,744,244 | * | 7/1973 | Swoager ............................ 60/464 X |
| 4,376,371 | * | 3/1983 | Kojima et al. ..................... 60/464 X |
| 4,628,690 | * | 12/1986 | Arai et al. ............................. 60/464 |
| 5,456,077 | | 10/1995 | Bartlett . |
| 5,930,997 | * | 8/1999 | Hayashi et al. ........................ 60/468 |

* cited by examiner

*Primary Examiner*—Hoang Nguyen
(74) *Attorney, Agent, or Firm*—Zarley, McKee, Thomte, Voorhees & Sease

(57) ABSTRACT

A loop flushing circuit for a hydrostatic transmission module includes a three position, three port pilot pressure operated loop flushing valve having a first inlet port fluidly connected to the first system pressure line, a second inlet port fluidly connected to the second system pressure line and an outlet port fluidly connecting the loop flushing valve to the case drain through a drain line having a drain orifice therein. A loop flushing and lubrication line fluidly connected to the drain line upstream of the drain orifice extends within the casing and has an open end directed toward the rotating elements of one of the pump and motor. The three position valve has an intermediate position operatively located between the opposite end positions. System pressure from at least one of the first and second system pressure lines is always routed to the loop flushing and lubrication line through the valve regardless of which of the three positions the valve is in. Thus, lubricating for the rotating elements is insured, even when the hydrostatic transmission module is in neutral.

9 Claims, 2 Drawing Sheets

LOOP FLUSHING CIRCUIT FOR LUBRICATING ROTATING ELEMENTS IN A HYDROSTATIC TRANSMISSION MODULE

BACKGROUND OF THE INVENTION

The present invention relates to the field of hydraulics. More particularly, this invention relates to a loop flushing circuit for a hydrostatic transmission. This invention provides pressurized lubrication for the rotating elements of the transmission. This invention was developed to provide lubrication flow to hydraulic components in an open case hydrostatic transmission module operating in a dry case environment. The invention does so without the need for external lubrication supply, hoses or external connections.

It is known that hydrostatic transmission modules can be incorporated into combination hydro-mechanical transmissions. In order to achieve a more compact design, the hydrostatic transmission module is often provided with an open casing and the hydrostatic transmission shares a common outer housing and reservoir with the mechanical portion of the hydro-mechanical transmission. In this situation, the hydrostatic transmission module must operate in a "dry case" or "non-full case" mode in which the hydraulic fluid that normally fills the hydrostatic transmission casing and lubricates the rotating elements of the hydrostatic transmission is drained to the common reservoir before it can lubricate the rotating elements. Therefore, the dry case mode creates a need for pressure lubrication of the hydrostatic rotating elements. In the context of this invention, the hydrostatic rotating elements can constitute various components including, but not limited to, pistons, slippers, cylinder blocks, shafts, gears and bearings. A reliable source and quantity of lubrication oil must be provided at all times, even when the hydrostatic transmission is in neutral. The rotating elements may still turn when the hydrostatic transmission is in neutral.

It is very difficult to design lubrication supply lines into the hydrostatic transmission module due to limited space and relevant movement of the module within the hydromechanical transmission. The hydrostatic transmission module is intended to be assembled as a separate module, then installed and mounted inside the hydro-mechanical transmission housing. Space surrounding the installed hydrostatic transmission module is minimal, making it difficult if not impossible to connect lubrication supply lines or hoses between the hydro-mechanical transmission housing and the hydrostatic transmission module. The hydrostatic transmission module may also move relative to the hydromechanical transmission housing due to the module being supported by elastomeric mounts within the housing.

Some closed loop hydrostatic transmission systems include an integrated loop flushing valve which automatically senses and drains a regulated quantity of oil from the low pressure side of the hydrostatic loop for cooling and filtration purposes. However, typical loop flushing valves block the flushing flow when the hydrostatic transmission is in neutral or when there is no pressure differential between the system pressure lines. See FIG. 1. Previously, the loop flushing oil from conventional flushing valves has been dumped into the hydrostatic transmission casing in full case systems or collected and sent to other parts of the vehicle hydraulic system in open case systems. In typical open case systems, two additional hydraulic connections between the hydrostatic module and the transmission housing are required: one for collecting the loop flushing oil and the other for the externally supplied lubrication oil.

As an alternative solution, lubrication has sometimes been provided internally from the charge circuit. This is a less desirable alternative because it results in higher power usage. Charge flow is typically at a higher pressure than necessary for lubrication, so using charge oil for lubrication wastes energy.

It is desirable to minimize the number of oil connections between the hydrostatic transmission module and the hydromechanical transmission to:
1. reduce cost;
2. minimize assembly time and complexity;
3. achieve a more compact design; and
4. minimize potential paths for noise transmission, both mechanical and hydraulic.

Furthermore, the hydrostatic transmission module lubrication flow could be an additional flow requirement on the vehicle. A way to avoid or minimize the need for a larger hydraulic pump and its power requirement is desired.

Therefore, a primary objective of this invention is the provision of a hydrostatic transmission module having a loop flushing circuit to provide pressure lubrication to rotating elements or for any other purpose under all operating conditions.

Another objective of the present invention is the provision of a hydrostatic loop flushing circuit which provides flushing flow and lubrication when the hydrostatic transmission module is in neutral, that is, has no differential loop pressure or flow.

Another objective of the present invention is the provision of a loop flushing circuit which supplies pressure lubrication to hydrostatic components, such as a pump or motor, operating in a "dry case" environment without the use of any external hydraulic hoses or lines.

Another objective of the present invention is the provision of a loop flushing circuit which allows selection of the loop flushing flow rate based on lubrication needs in addition to the traditional criteria of loop cooling and contamination flushing requirements.

Another objective of the present invention is the provision of a loop flushing circuit which has minimal impact on power usage.

Another objective of the present invention is the provision of a loop flushing circuit which aids in achieving a more compact design of the hydrostatic transmission module and the hydro-mechanical transmission.

Another objective of the present invention is the provision of a loop flushing circuit which reduces costs, assembly time and complexity.

Another objective of the present invention is the provision of a loop flushing circuit which avoids the need for additional components and the connections that are potential paths for noise transmission, both mechanical and hydraulic.

These and other objectives will be apparent from the drawings, as well as the description and claims which follow.

SUMMARY OF THE INVENTION

The present invention relates to the field of hydraulics. More particularly, this invention relates to a loop flushing circuit for a hydrostatic transmission. This invention provides pressurized lubrication for the rotating elements of the transmission. This invention was developed to provide lubrication flow to hydraulic components in an open case hydrostatic module operating in a dry case environment, without the need for external lubrication supply.

The loop flushing circuit of this invention includes a three position, three port pilot pressure operated loop flushing valve having a first inlet port fluidly connected to the first system pressure line, a second inlet port fluidly connected to the second system pressure line and an outlet port fluidly connecting the loop flushing valve to the interior of the open casing through a drain line having a drain orifice therein. A loop flushing line fluidly connected to the drain line upstream of the drain orifice extends within the casing and has an open end directed toward rotating elements in the pump and/or motor. The three position valve has an intermediate position between the opposite end positions. System pressure from at least one of the first and second system pressure lines is always routed to the loop flushing line through the valve regardless of which of the three positions the valve is in. Thus, pressurized lubrication for the rotating elements is provided, even when the hydrostatic transmission module is in neutral.

DETAILED DESCRIPTION OF THE PREFERRED EMBODIMENT(S)

Figure 1:
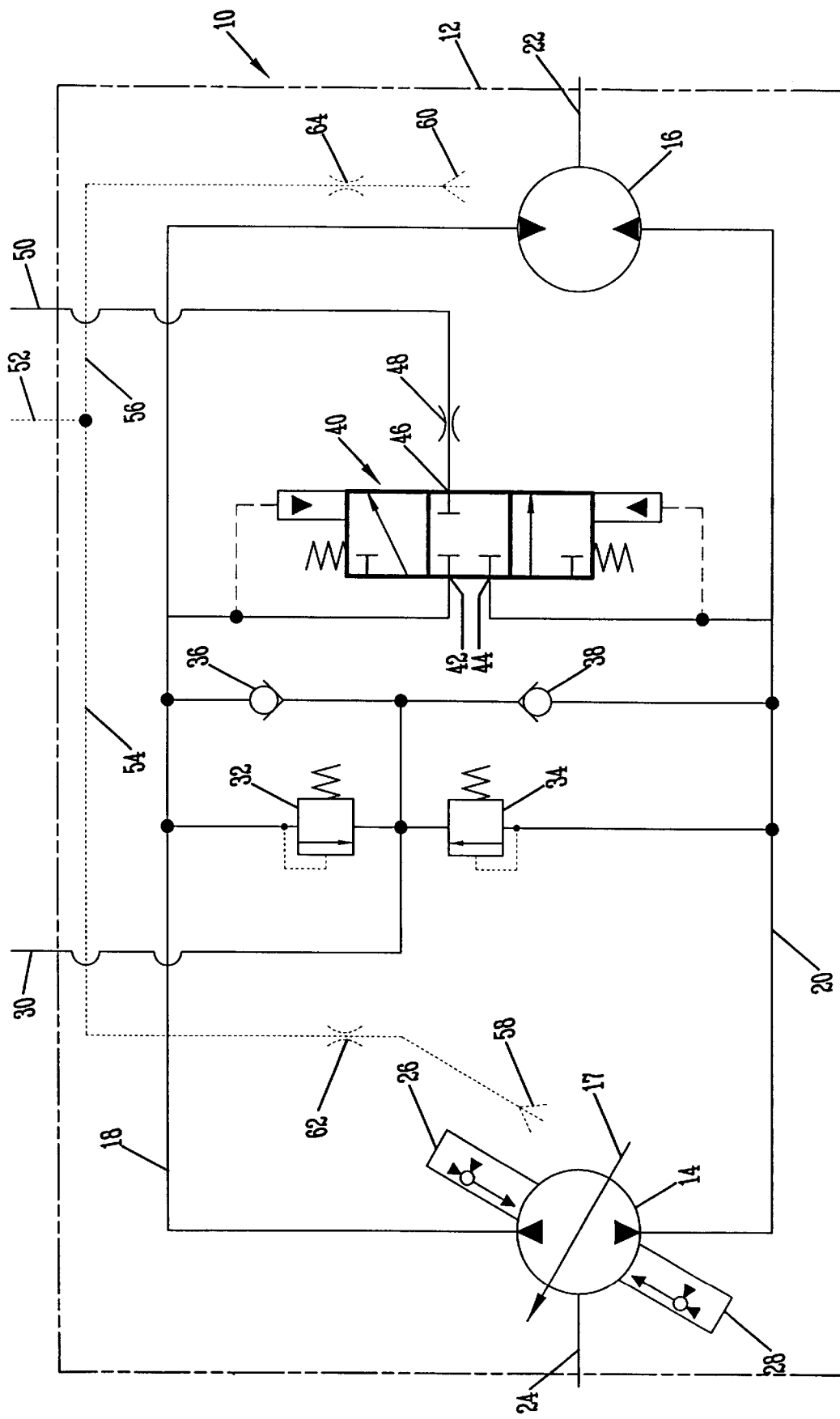
FIG. 1 is a schematic diagram of a prior art loop flushing circuit or system for an open case hydrostatic transmission.

The present invention can best be understood by comparing it to a traditional loop flushing circuit or system shown in FIG. 1. In FIG. 1, a hydrostatic transmission 10 has an open casing 12 (indicated by the short and long dashed lines) supporting and at least partially enclosing a hydraulic pump 14 and a hydraulic motor 16. The pump 14 and the motor 16 are fluidly connected by a pair of system pressure lines 18–20.

Preferably, the hydraulic pump 14 is a variable displacement hydraulic pump and the motor 16 is a fixed displacement motor, but a variable motor can also be used. When the displacement of the motor is fixed, the flow and pressure of the hydraulic fluid (usually oil) in the system pressure lines 18, 20 are determined primarily by the displacement of the variable pump 14 and the load on the motor. As is conventional, the pump 14 has a swashplate as indicated by 17 that is infinitely variable in forward, reverse and neutral positions. For example, in forward positions, the pressure in line 18 is greater than the pressure in line 20 and the motor shaft 22 rotates in one direction in response to the pump shaft 24 rotating in a particular direction. When the swashplate 17 of the variable pump 14 is moved by the servos 26, 28 to a reverse position, the pressure in line 20 is greater than the pressure in line 18. Therefore, the shaft 22 of the motor 16 rotates in an opposite direction. The above-described basic structure of a closed-circuit hydrostatic transmission is well known in the hydraulic art.

To replenish hydraulic losses in the closed-circuit hydrostatic transmission, an external source (not shown) of charge supply fluid is provided as indicated by the charge supply line 30. Conventional high pressure relief valves 32, 34 and check valves 36, 38 are provided as shown to limit system pressure and charge the low pressure side of the loop. The high pressure relief valves 32, 34 limit the system pressure in the respective system pressure lines 18, 20. The check valves 36, 38 allow replenishment fluid and flow from the relief valves 32, 34 to enter the low side of the loop.

A traditional loop flushing valve 40 is connected to the system pressure lines 18, 20 downstream of the high pressure relief valves 32, 34 and the check valves 36, 38 as shown. The loop flushing valve 40 is a pilot pressure operated three position, three port valve. The valve 40 has a first port or opening 42 and a second inlet port or opening 44. Depending upon the position of the valve 40, the inlet ports 42 and 44 are selectively connectable with an outlet port or opening 46. The valve 40 has opposite end positions and an intermediate position therebetween. The valve 40 is pilot pressured centered, but is urged into one of the opposite end positions whenever a pressure differential exists between the system pressure lines 18 and 20. In both of the opposite end positions of the valve 40, the system pressure line 18, 20 having the lowest pressure at the time is connected through one of the inlet ports 42, 44 to the outlet port 46. However, in the intermediate position, the valve 40 blocks the inlet ports 42, 44 and the outlet port 46 when there is no differential pressure between the system lines 18, 20, such as when the hydrostatic transmission 10 is in neutral.

An orifice 48 is provided downstream of the valve 40. The orifice 48 can also be incorporated into the valve 40 itself. A loop flushing line 50 extends downstream of the orifice 48 and then outside the casing 20, carrying loop flushing oil to other parts of the hydro-mechanical transmission for processing. Eventually, the loop flushing oil ends up in the fluid reservoir (not shown) of the hydro-mechanical transmission. Then, a source of external lubrication supply (not shown) returns fluid from the reservoir through an external lubrication supply line 52. Obviously, this arrangement requires attaching external hoses and lines to the hydrostatic transmission module 10 at the casing 12.

Internal passages 54, 56 extend within the casing and have open ends 58, 60 respectively that are generally adjacent to and directed toward the rotating elements of the pump 14 and motor 16 respectively. As mentioned earlier, the rotating elements of the pump 14 and motor 16 include the rotating cylinder block kits, bearings, etc. Orifices 62, 64 are respectively disposed in the internal lubrication lines 54, 56 upstream of the respective open ends 58, 60. The orifices 62, 64 limit the lubricating fluid flow to the openings 58, 60. Thereby, a pressurized source of lubrication is provided for the rotating elements of the pump 14 and the motor 16.

Figure 2:
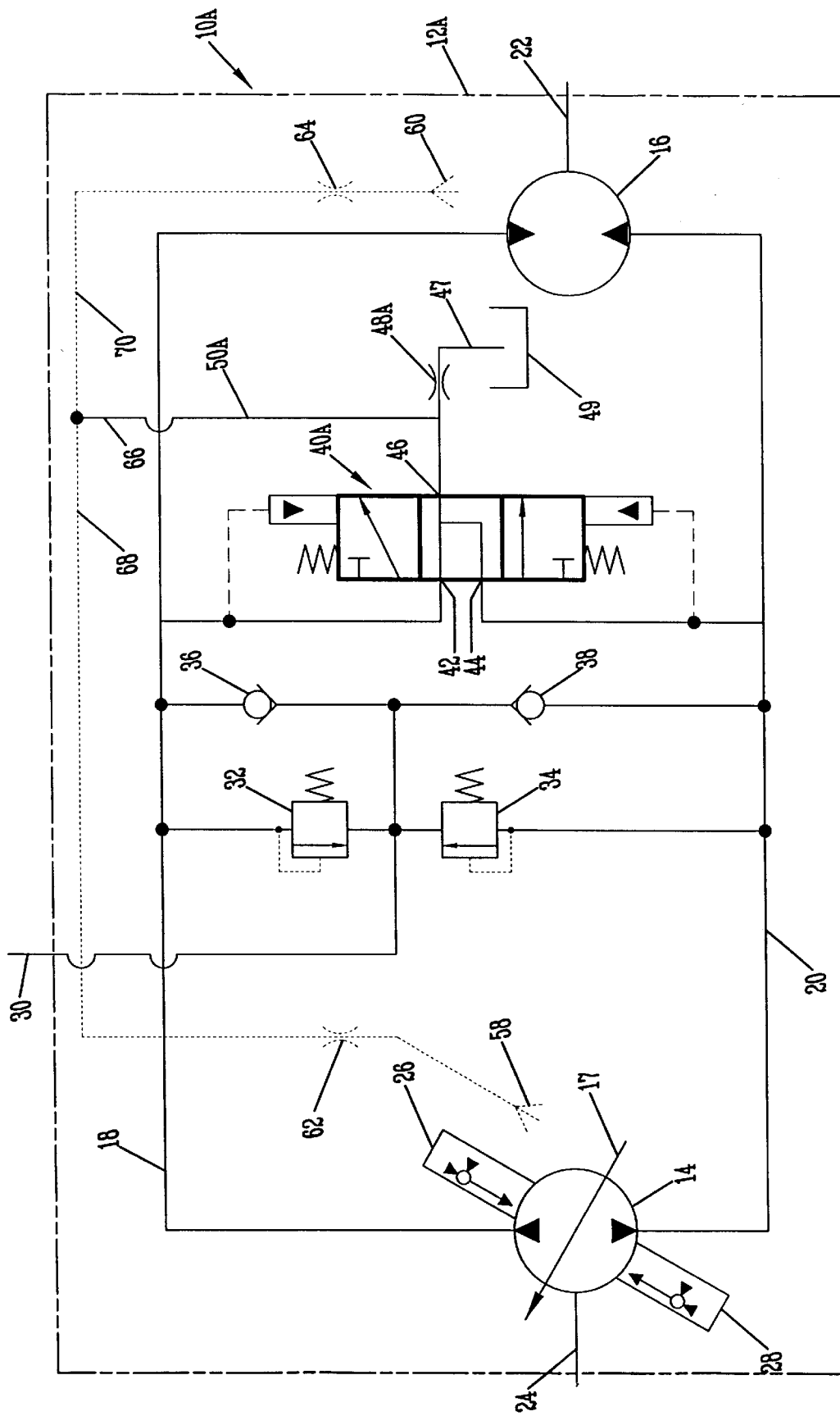
FIG. 2 is a schematic diagram of the loop flushing circuit or system of the present invention.

Referring now to the present invention shown in FIG. 2, like components have been labeled with the same reference numerals as used in FIG. 1. However, the loop flushing circuit of this invention utilizes a different loop flushing valve 40A and novel circuitry downstream of this valve.

The loop flushing valve 40A is pilot pressure operated and centered such that an intermediate position that will be maintained or assumed anytime no pressure differential exists between the system pressure lines 18, 20. Thus, the intermediate position of the valve will be assumed as an equilibrium position when the hydrostatic transmission module is in neutral. In the intermediate position of the valve 40A, the inlet ports 42 and 44 are both internally connected to the outlet port 46 of the valve.

A drain line 47 having a drain orifice 48A therein extends from the outlet port 46 to the interior of the open case 12. Thus, the loop flushing valve 40A is connected to the case drain 49 of the hydrostatic transmission module 10. A loop flushing line 50A is connected to the drain line 47 upstream of the orifice 48A. The loop flushing line 50A has a main branch 66 which preferably splits into a pump branch 68 and a motor branch 70. The loop flushing line 50A is internal to the casing 12 and extends completely therewithin. The same is true for the branches 66, 68 and 70. Again, orifices 62, 64 are located upstream of the end openings 58, 60. The end opening 58, 60 are generally adjacent to and directed forward the rotating elements.

In operation, the loop flushing circuit of the present invention operates in the following manner. When the pressure in the first system pressure line 18 is higher than the pressure in the second system pressure line 20, the loop flushing valve 40A is pressure piloted into a first position wherein the first inlet port 42 is blocked and the second inlet port is open so as to port fluid from line 20 to the drain line 47 and the loop flushing line 50A. When the pressure in the second system pressure line 20 is higher than the pressure in the first system pressure line 18, the loop flushing valve 40A is pressure piloted into a second, opposite end position. The valve 40A blocks the second inlet port 44 and opens the first inlet port 42 so as to port fluid from the first system pressure line 18 to the drain line 47 and the loop flushing line 50A.

Additionally, when the pressure in the first and second system pressure lines is equal, i.e., such that no pressure differential exists between the first and second system pressure lines 18, 20, the loop flushing valve 50A assumes equilibrium in an intermediate third position between the first two positions. In the intermediate position, the valve internally connects both of the first and second inlet ports 42, 44 to the outlet port 46 so as to port fluid to the drain line 47 and the loop flushing line 50A. Since the main branch 66 of the loop flushing line 50A is connected upstream of the drain orifice 48A and splits into branches 68, 70, there is a constant source of pressurized fluid lubrication for the rotating elements of the pump 14 and/or motor 16. The intermediate position of the loop flushing valve 50A insures that system pressure from at least one of the first and second system pressure lines 18, 20 is always routed to the loop flushing line 50A through the valve 40A, regardless which of the three positions the valve is in. As long as the pump shaft 24 rotates, pressurized fluid for lubrication will be delivered to the rotating elements. The present invention provides effective loop flushing and pressure lubrication for the rotating elements of the hydrostatic transmission in "dry case" situations, even when the hydrostatic transmission is in neutral. The hydrostatic transmission module 10A of the present invention is more compact and requires fewer external hoses and connections than existing modules. The module 10A is simple to manufacture, assemble and test at low cost.

Therefore, it can be seen that the present invention at least accomplishes its stated objectives.

What is claimed is:

1. A closed circuit hydrostatic transmission comprising:
    an open casing at least partially enclosing rotating elements of a hydraulic pump and rotating elements of a hydraulic motor;
    the hydraulic pump and motor being fluidly connected by first and second system pressure lines;
    a three position, three port pilot pressure operated loop flushing valve having a first inlet port fluidly connected to the first system pressure line, a second inlet port fluidly connected to the second system pressure line, and an outlet port fluidly connecting the loop flushing valve to a case opening in the open case through a drain line having a drain orifice therein; and
    a hydraulic loop flushing line fluidly connected to the drain line upstream of the drain orifice, the loop flushing line extending within the casing and having an open end generally adjacent to and directed toward the rotating elements of one of the pump and motor;
    the three position loop flushing valve having an intermediate position between two opposite end positions and wherein system pressure from at least one of the first and second system pressure lines is always routed to the loop flushing line through the valve regardless of which of the three positions the valve is in.

2. The transmission of claim 1 wherein the loop flushing line has a main branch connected to the drain line and the main branch splits into a first branch having an open end operatively associated with the pump and a second branch having an open end operatively associated with the motor.

3. The transmission of claim 2 wherein the main branch, the first branch, and the second branch are all completely disposed within the casing.

4. The transmission of claim 1 wherein the loop flushing line is a passageway extending entirely within the casing from the drain line to the open end of the loop flushing line.

5. The transmission of claim 1 comprising an orifice in the loop flushing line upstream of the open end.

6. The transmission of claim 1 wherein the pump is a variable displacement hydraulic pump.

7. The transmission of claim 1 wherein both the first and second system pressure lines are fluidly connected to the outlet port through the valve in the intermediate position of the valve.

8. A closed circuit hydrostatic transmission comprising:
    an open casing supporting and at least partially enclosing rotating elements of a hydraulic pump and rotating elements of a hydraulic motor;
    the hydraulic pump and motor being fluidly connected by first and second system pressure lines;
    a three position, three port pilot pressure operated loop flushing valve having a first inlet port fluidly connected to the first system pressure line, a second inlet port fluidly connected to the second system pressure line, and an outlet port fluidly connecting the loop flushing valve to the interior of the open case through a drain line having a drain orifice therein; and
    a hydraulic loop flushing line fluidly connected to the drain line upstream of the drain orifice, the loop flushing line extending within the casing and having an open end generally adjacent to and directed toward the rotating elements of one of the pump and motor;
    whereby, when the pressure in the first system pressure line is higher than the pressure in the second system pressure line, the loop flushing valve is pressure piloted into a first position wherein the first inlet port is blocked and the second inlet port is opened so as to port fluid to the drain line and the loop flushing line;
    whereby, when the pressure in the second system pressure line is higher than the pressure in the first system pressure line, the loop flushing valve is pressure piloted into a second position wherein the second inlet port is blocked and the first inlet port is opened so as to port fluid from the first system pressure line to the drain line and the loop flushing line; and
    whereby, when the pressure in the first and second system pressure lines is equal such that no pressure differential exists between the first and second system pressure lines, the loop flushing valve moves to equilibrium in an intermediate third position between the first two positions wherein both of the first and second inlet ports are opened so as to port fluid to the drain line and the loop flushing line;
    thereby a constant source of fluid lubrication is provided for the rotating elements of one of the pump and motor.

9. A loop flushing and lubrication circuit for hydrostatic transmission module having an open casing supporting and at least partially enclosing rotating elements of a hydraulic pump and rotating elements of a hydraulic motor, the pump and motor being fluidly connected by first and second system pressure lines, the loop flushing and lubrication circuit comprising:

a three position, three port pilot pressure centered loop flushing valve having a first inlet port fluidly connected to the first system pressure line, a second inlet port fluidly connected to the second system pressure line, and an outlet port fluidly connecting the loop flushing valve to a case drain opening in the open case through a drain line having a drain orifice therein; and a hydraulic loop flushing and lubrication line fluidly connected to the drain line upstream of the drain orifice, the loop flushing and lubrication line extending within the casing and having an open end generally adjacent to and directed toward the rotating elements of one of the pump and motor;

the three position loop flushing valve having an intermediate position between opposite end positions and wherein system pressure from at least one of the first and second system pressure lines is always routed to the loop flushing and lubrication line through the valve regardless of which of the three positions the valve is in.

* * * * *